United States Patent

Banks et al.

Patent Number: 5,573,740
Date of Patent: Nov. 12, 1996

[54] METHOD AND APPARATUS FOR GENERATING PHOSPHINE

[75] Inventors: Henry J. Banks, Pialligo; Colin J. Waterford, McGregor, both of Australia

[73] Assignee: Commonwealth Scientific and Industrial Research Organization, Campbell, Australia

[21] Appl. No.: 956,778

[22] PCT Filed: Jun. 21, 1991

[86] PCT No.: PCT/AU91/00264

§ 371 Date: Feb. 11, 1993

§ 102(e) Date: Feb. 11, 1993

[87] PCT Pub. No.: WO91/19671

PCT Pub. Date: Dec. 26, 1991

[30] Foreign Application Priority Data

Jun. 29, 1990 [AU] Australia ............................. PK0918/90
Jun. 21, 1991 [AU] Australia ............................. PK0732/90

[51] Int. Cl.$^6$ ............................. C01B 25/00; B01J 16/00
[52] U.S. Cl. ..................... 423/299; 422/231; 422/239; 422/284; 422/290; 422/305
[58] Field of Search ............................. 423/299; 422/211, 422/222, 231, 284, 290, 239, 305

[56] References Cited

U.S. PATENT DOCUMENTS

| | | | |
|---|---|---|---|
| 3,899,375 | 8/1975 | Palmer | 423/299 |
| 4,261,955 | 4/1981 | Bailey et al. | 422/239 |
| 4,814,154 | 3/1989 | Doernemann et al. | 423/299 |
| 4,981,676 | 1/1991 | Minet et al. | 423/652 |
| 5,156,827 | 10/1992 | Tom et al. | 423/299 |
| 5,260,022 | 11/1993 | Schellhaas et al. | 422/305 |

*Primary Examiner*—Wayne Langel
*Attorney, Agent, or Firm*—Ladas & Parry

[57] ABSTRACT

Phosphine is generated by the reaction of water with a metal phosphide formulation. In one embodiment, the formulation is within a housing closed by a membrane which is permeable to water and phosphine. A water-containing gas flows across the membrane and water from the gas permeates into the housing to react with the phosphide, producing phosphine which also permeates through the membrane to enter the gas flow. Two membranes may be used to close the housing, one permeable to water, the other permeable to phosphine. A blanking plate and phosphine absorber may be included to control the phosphine production. In a second embodiment, pellets of a phosphide formulation are transferred, periodically, from a hopper to a chamber containing water. The transfer is effected by a disc member mounted below the hopper and above the chamber. The disc member has at least one aperture in it, within which pellets are transported from the hopper outlet to an inlet port of the chamber. Control of the phosphine production is supplemented by varying the water temperature and by using a safety arrangement adapted to supply a purge gas to the generator. The safety arrangement utilises a reservoir of the purge gas (usually dry air, nitrogen or carbon dioxide) at high pressure, established prior to the operation of the phosphine generator. If the electrical power supply to the generator fails, or if the gas pressure or the phosphine concentration in the generator is too high, a valve opens to let the purge gas flow from the reservoir into the generator.

45 Claims, 5 Drawing Sheets

METHOD AND APPARATUS FOR GENERATING PHOSPHINE

TECHNICAL FIELD

This invention concerns the generation of phosphine and safety systems for phosphine generators. More particularly it concerns the controlled production of phosphine (preferably using a phosphine generator which incorporates a novel safety system) for use in, for example, the fumigation of grain and similar products stored in bulk. However, the present invention is not restricted in its use to the fumigation of grain (and it should be noted that in the context of this specification, the term "grain" will be regarded as encompassing grains of all types and pulses, and similar materials). Other uses of the phosphine generators of this invention include the fumigation of greenhouses, herbariums and rabbit warrens.

BACKGROUND TO THE INVENTION

Phosphine ($PH_3$) is a preferred gaseous fumigant for stored grain because any residue of the fumigant will be lost or oxidised to a harmless phosphate when the grain is processed to produce a food. The phosphine is normally produced by the action of water or water vapour on a metal phosphide (typically aluminium phosphide or magnesium phosphide).

The conventional technique for generating phosphine for disinfesting a grain silo or the like involves the use of a probe to position formulations of aluminium phosphide or magnesium phosphide within the grain mass, where moisture from the grain, or in the air circulating through the grain, reacts with the phosphide to generate phosphine. A modification of this technique involves the placement of pellets of a metallic phosphide in the head-space of a grain silo and allowing the phosphine produced when the phosphide reacts with moisture in the atmosphere above the grain to be circulated through the stored grain by the natural convection currents that are present in the silo. These techniques, however, cannot be guaranteed to supply phosphine to all regions of the bulk stored grain to eradicate weevils and other unwanted grain pests. In addition, when these techniques are used, there is no control over the concentration of phosphine in the grain after the phosphide formulation has been added, and there is no possibility of regulating the concentration/time regime in the bulk storage to be most effective. The use of a probe to insert pellets into the grain mass also requires a significant labour input.

An alternative fumigation technique requires the placement of a quantity of a metallic phosphide (in granular or pellet form) in the head space above the grain, then actively recirculating air from the head space through the grain using recirculation ducts. This technique also has the disadvantage of lack of control over the concentration of phosphine in the grain after the phosphide formulation has been placed in the head space. The same disadvantage occurs when (in a modified form of this technique) the phosphide formulation is placed in a recirculation duct instead of being placed in the head space.

It has also been proposed that phosphine from cylinders of the gas (usually mixed with carbon dioxide) should be mixed with air externally of the stored grain and the resultant gas mixture should then be pumped through the grain. This disinfestation of the grain should be carried out periodically, or whenever it is perceived that fumigation of the grain is necessary or desirable. A major difficulty with this approach to the fumigation of grain is the need to guarantee the provision of expensive cylinders of the gas mixture (usually containing only 3 per cent phosphine) to the treatment site.

Clearly it would be advantageous to have a method of generating phosphine in a controlled manner at the treatment site using the readily available commercial phosphide formulations or similar light and easily handled feedstock. One such on-site phosphine generator is described in the specification of European patent application No 88119701.6, which is European publication No A-0318040.

There is one major problem with the use of phosphine, namely its flammability and explosivity in air at certain concentrations. The generally accepted maximum concentration of phosphine in air at standard temperature and pressure that can be used without the risk of an explosion is 1.79 per cent by volume. In a paper entitled "The Flammability Limit of Pure Phosphine-Air Mixtures at Atmospheric Pressure", by A R Green et al, published in "Controlled atmosphere and fumigation in grain storages" (Edited by B E Ripp et al), Amsterdam, Elsevier, 1983, pages 433–449, this "explosion limit" is confirmed and further information is provided about the flammability properties of phosphine. Other potential problems with the use of phosphine are the toxicity of phosphine to mammals when the phosphine is present in high concentrations, and the exothermic nature of the hydrolysis reaction to produce the phosphine. Thus the use of on-site phosphine generators, such as the generator described in European publication No. A-0318040, present a number of hazards to the user. In addition, with the fumigation regimes now being employed (for example, maintaining low phosphine concentrations for long periods), it is likely that the on-site phosphine generators may be left unattended for long periods. This is particularly likely to be the situation when the phosphine generator is used in connection with the fumigation of storages at remote locations.

Consequently, it is highly desirable that an on-site phosphine generator is used with a safety system which prevents the generation of phosphine in high concentrations in the event of a failure of the electrical power supply or any other system malfunction of the generator. It is also desirable to have a safety system which will prevent the build-up of phosphine within generators, due to residual and adsorbed moisture within the generator, following normal shut-down of the generator.

European publication No. A-0318040 discloses safety systems which admit an inert fluid into the phosphine generator, to displace moist air from the generator and thus prevent contact of that moist air with the metal phosphide in the generator, should there be a system failure leading to excessive phosphine concentrations. The safety systems are operable in response to a predetermined pressure drop within the generator. However, because these systems respond only to a loss of system pressure, they inherently provide a time delay before they become operable in the event of an electrical power failure. Furthermore, in the safety systems described in European publication No A-0318040, the purging fluid is preferably a liquid (for example, a mineral oil of low viscosity, methylene chloride or another, preferably organic, liquid which is inert to the metal phosphide contained in the generator). Thus a reservoir of the purging liquid must be provided at the generator site and this purging liquid reservoir must be full of the purging liquid at all times. Another disadvantage of using the purging fluids disclosed in European publication No A-0318040 is that they effectively destroy the phosphide bed in the generator and thus provide a safety system which can be used once only. There is also the problem of disposing of the contaminated bed of metallic phosphide following activation of the safety system, for the phosphide bed retains the potential to generate phosphine when it subsequently comes into contact with moisture.

DISCLOSURE OF THE PRESENT INVENTION

It is an object of the present invention to provide an improved method and apparatus for generating phosphine in a controlled way, which may be used in the fumigation of a grain mass or other product, and which avoids (a) the cost and the logistic problems associated with the distribution of gas cylinders to remote locations, and (b) the labour costs associated with the probing system described above.

A preferred form of the apparatus of the present invention includes a quick acting safety system for phosphine generators of the type in which phosphine is produced by the reaction of water and a phosphide formulation, which does not destroy the capacity of the phosphide formulation to produce phosphine and which can be automatically de-activated when phosphine production may recommence (for example, when electrical power has been reconnected following a power failure) and restored to its "ready to operate again" mode.

The objective of the present invention is achieved by reacting a phosphide with liquid water or water vapour in a controlled manner and including the phosphine so generated in an air stream which may be passed through grain or other product to be fumigated. The concentration of phosphine can be high (that is, of the order of from 2 g to 5 g of phosphine per cubic metre of air) when, for example, rapid grain disinfestation of a grain mass is required. The concentration of phosphine may be low (that is, in the range of from 0.005 g to 0.02 g per cubic metre) when a prophylactic fumigation dose is required for a thoroughly fumigated bulk storage of grain. The phosphine may have a medium concentration of about 0.2 g per cubic metre of air when a general fumigation of a stored grain supply is required. The phosphine may also be included in a circulating supply of air, in which case a set rate of production of the phosphine may be required to maintain a predetermined concentration of phosphine in the circulating air.

To generate the controlled supply of phosphine, any one of two phosphine generation techniques, and their associated apparatus constructions, may be used.

The first phosphine generation technique requires the enclosure of a phosphide formulation in a housing which is closed by a membrane that has a known permeability to water and phosphine. Water present in the region adjacent to this membrane but outside the housing permeates through the membrane where it reacts with the phosphide formulation to produce phosphine. The phosphine thus formed permeates back through the membrane, or through a second membrane which also acts as a closure for the housing, to be included in a gas flow (usually an air flow) past the membrane (or past the second membrane).

The second phosphine generating technique involves the periodic addition of a small quantity of a phosphide formulation to an excess of water.

Thus, according to the present invention, there is provided a method of generating phosphine which comprises the steps of (a) providing a housing in which is located a quantity of a metal phosphide formulation, the housing being closed by a membrane that is permeable to water and phosphine; and (b) establishing, outside the housing but adjacent to the membrane, a flow of gas which contains water vapour or liquid water;

whereby water from said gas flow permeates through the membrane and reacts with the phosphide formulation to form phosphine, the phosphine then permeating through the membrane and entering said gas flow.

Also according to the present invention, there is provided a method of generating phosphine which comprises the steps of (a) providing a housing in which is located a quantity of a metal phosphide formulation, the housing being closed by first and second closure members, said closure members being separate from each other, said first closure member comprising a first membrane that is permeable to water, said second closure member comprising a second membrane that is permeable to phosphine;

(b) establishing a gas flow outside the housing across the second membrane; and (c) establishing an atmosphere containing water vapour or water, or providing a layer of water, outside said housing but adjacent to said first membrane;

whereby water permeates through the first membrane and reacts with the phosphide formulation to form phosphine, the phosphine thus produced then permeating through the second membrane to enter said gas flow.

Further according to the present invention, apparatus for the production of phosphine comprises (a) a housing constructed of a water-impermeable material, said housing being adapted to contain a quantity of a metal phosphide formulation;

(b) a closure member for said housing, said closure member comprising a membrane that is permeable to water M water vapor, and is also permeable to phosphine;

(c) a chamber located adjacent to said housing, said membrane comprising at least part of a common wall of said chamber and said housing; and (d) means to establish a flow of gas containing water vapour or liquid water through said chamber.

Still further according to the present invention, there is provided apparatus for the production of phosphine which comprises (a) a housing constructed of a water-impermeable material, said housing being adapted to contain a quantity of a metal phosphide formulation;

(b) a first closure member for said housing, said first closure member comprising a first membrane that is permeable to water or water vapor;

(c) a second closure member for said housing, said second closure member being separate from said first closure member, said second closure member comprising a second membrane, said second membrane being permeable to phosphine;

(d) a first chamber located adjacent to said housing, the first membrane comprising at least part of a common wall of said first chamber and said housing;

(e) a second chamber located adjacent to said housing, said second membrane comprising at least part of a common wall of said second chamber and said housing; and (f) means to establish a flow of gas through said second chamber.

Preferably, each form of the apparatus for generating phosphine includes a moveable plate or baffle for controlling the rate at which water permeates into the housing, and also includes a phosphine absorbent member that can be inserted into the housing to absorb excess phosphine, if required.

Normally, when two membranes are used in the method or apparatus of the present invention, the membranes will constitute closures on opposed sides or ends of the housing in which the phosphide formulation is present. The membranes may each be membranes of a material that is permeable to both water and phosphine.

Also in accordance with the present invention, there is provided a method of generating phosphine which comprises the steps of:

(a) providing a first container, containing water;

(b) mounting, on top of said first container and in spaced relationship thereto, a second container, the second container containing a plurality of tablets or pellets of a phosphide formulation;

(c) periodically removing one of the tablets or pellets of the phosphide formulation from the second container and depositing the removed tablet or pellet in said first container, whereby the tablet or pellet contacts and reacts with the water in the first container to form phosphine; and (d) extracting the phosphine so produced from the first container.

Normally, the steps (c) and (d) of this method will be performed at a predetermined rate, chosen to establish a steady rate of phosphine production.

Further still in accordance with the present invention, there is provided apparatus for generating phosphine in accordance with the method recited in the last two preceding paragraphs, the apparatus comprising (a) a chamber adapted to contain water, said chamber having a gas outlet port above the level of water normally within the chamber, said chamber being closed by a top wall having an inlet port therein;

(b) a hopper adapted to contain a plurality of tablets or pellets of a phosphide formulation, said hopper being mounted above said chamber, said hopper having a tablet or pellet outlet;

(c) tablet or pellet transfer means mounted between said hopper and said chamber, said transfer means comprising a disc member having at least one aperture therein, said or each aperture being dimensioned to receive one of said tablets or pellets, said disc member being moveable so that said or each aperture may be periodically positioned at a first location in which the or each aperture is directly below the tablet or pellet outlet of the hopper, and at a second location in which said or each aperture is directly above the inlet port of said chamber, whereby a pellet or tablet deposited in the aperture at the first location is discharged from the aperture and into the chamber when the aperture is at said second location; and (d) means to cause the movement of said disc member; whereby, when the apparatus is in use, each tablet or pellet of phosphide formulation which falls from the or an aperture in the disc member into said chamber reacts with water in the chamber to produce phosphine, said phosphine being removed from the chamber through the gas outlet port.

The disc member may be a circular disc member, which is rotated about a substantially vertical axis, or it may be an elongate disc which is reciprocally moved within an associated guide.

Normally, means to stir the water in the chamber will be provided, and a thermostatically controlled heater will be mounted within the chamber to maintain the temperature of the water in the chamber at a predetermined value.

This type of phosphine generation apparatus preferably includes a gas extraction arrangement to cause the phosphine (and air) within the chamber to be removed from the chamber through the gas outlet port.

This type of phosphine generation apparatus also preferably includes a safety system comprising:

(a) a reservoir for storing a purge gas at a relatively high pressure;

(b) gas supply means to supply the purge gas to said reservoir and to establish and maintain said purge gas at relatively high pressure in said reservoir during normal operation of the phosphine generator;

(c) a purge gas supply conduit connecting said reservoir to said chamber; and (d) a flow regulator and a valve in said purge gas supply conduit; said valve being maintained closed (i) during the establishment of a supply of purge gas at high pressure in said reservoir, and (ii) when electrical power is supplied to the phosphine generator and/or the concentration of phosphine in the chamber is below a predetermined value, and/or the gas pressure in said chamber is below a predetermined value; said valve being opened when the supply of electrical power to the phosphine generator fails or when the concentration of phosphine within the chamber exceeds said predetermined concentration value, or when the gas pressure in the chamber exceeds said predetermined gas pressure value; the opening of said valve permitting the purge gas to flow from said reservoir into said chamber, to dilute the phosphine concentration in said chamber and to displace the gas within said chamber, thereby preventing the establishment within said chamber of an explosive phosphine-containing gas mixture.

The purge gas will normally be air, from which moisture has been removed by passage through a desiccant bed or by use of another known form of dehumidifier. When air is the purge gas, a compressor will be used as the gas supply means to establish the supply of relatively high pressure purge gas in the reservoir. However, the purge gas may be nitrogen, carbon dioxide, or another inert gas or gas mixture, obtained from a cylinder of compressed purge gas.

This safety, system may be used with any one of the phosphine generators of the first aspect of the present invention. It may also be used with prior art phosphine generators of the type described in European publication No. A-0318040.

Embodiments of the present invention will now be described, by way of example only, with reference to the accompanying drawings.

DETAILED DESCRIPTION OF THE ILLUSTRATED EMBODIMENTS

Figure 1:
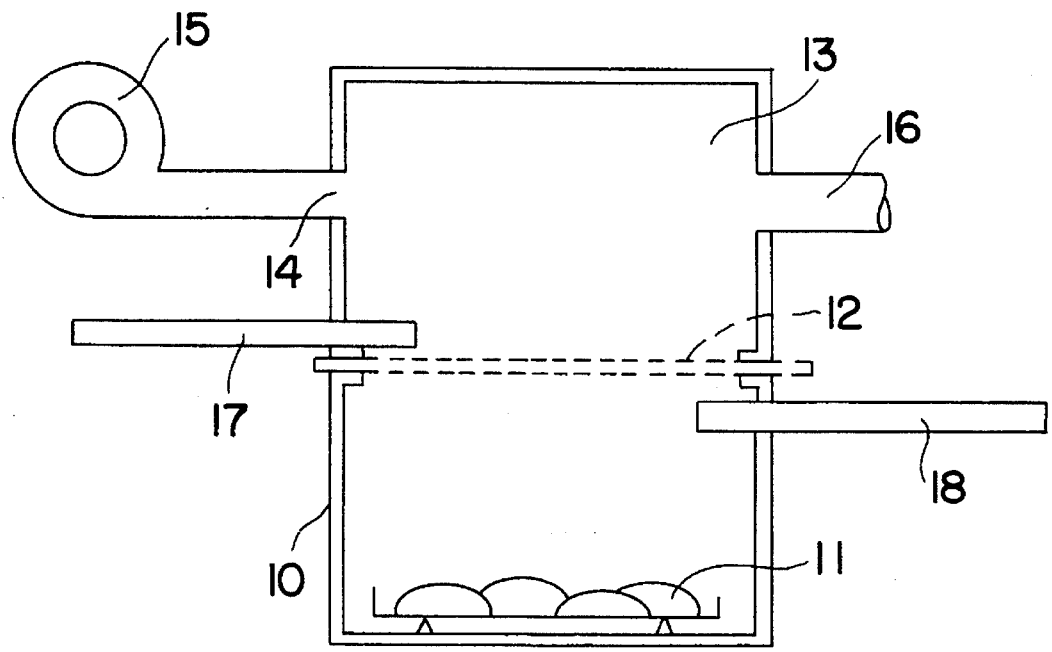
FIG. 1 is a partly schematic sectional view of one form of phosphine generating apparatus in which moisture permeates through a membrane and reacts with a phosphide formulation.

The apparatus illustrated schematically in FIG. 1 consists of a housing or lower chamber 10 in which a quantity of a metal phosphide formulation 11 has been placed. The metal phosphide in the formulation is preferably aluminium phosphide, but magnesium phosphide may be used when quicker generation of phosphine is required (the reaction between water and magnesium phosphide is more violent than the reaction between water and aluminium phosphide). Usually, the phosphide 11 will be in particulate or pellet form, on at least one gas-permeable tray positioned within the housing 10. Normally, additives to prevent the auto-ignition (explosive polymerisation) of the phosphine produced by the reaction of the phosphide with water will be included in the phosphide formulation.

The housing or lower chamber 10 may be any suitable shape and need not have a uniform horizontal cross-section as shown in FIG. 1. However, it must be made from a material which does not react with phosphine. Preferably the chamber 10 is constructed using stainless steel or a moisture impermeable plastic material.

The housing 10 has a top closure member which comprises a membrane 12. In FIG. 1, the membrane 12 is shown as a membrane covering the entire horizontal cross-section at the top of the housing 10. However, in practice, the membrane 12 may be a portion only of the closure member used with the housing 10. The membrane 12 is permeable to water, and also to phosphine. A suitable membrane material is silicone rubber, through which water permeates slowly and phosphine permeates rapidly. However, a cellulose membrane may be used (as may a membrane of any other material which performs in the required manner).

A chamber 13 is positioned above the housing 10. The chamber 13 has an opening or an open face which is located adjacent to the closure member of the housing 10, so that the membrane 12 forms at least part of a common wall of the housing 10 and the chamber 13. In practice, it will be convenient for the housing 10 and the chamber 13 to be formed, as shown in FIG. 1, with essentially the same horizontal cross-section, with corresponding open faces, and with horizontally extending flanges surrounding their open faces, so that the membrane (or a closure member which includes a membrane) can be supported between the flanges.

The chamber 13 is provided with a gas inlet port 14 and a gas outlet port 16. A gas (usually air) which contains water in a constant concentration is blown into the chamber 13 by a fan 15, and leaves the chamber 13 via the outlet port 16. Arrangements for ensuring that a gas contains a predetermined concentration of water are well known, one example being described in European publication No A-0318040.

Within the chamber 13, some of the water in the gas passing through the chamber permeates through the membrane 12, to enter the housing 10 where it reacts with the phosphide in the formulation in the housing to produce phosphine. The phosphine so produced permeates through the membrane 12, to enter the chamber 13, where it becomes part of the gas (air) which is flowing through the chamber 13 and leaving via the gas outlet port 16.

The gas containing phosphine which leaves the chamber 13 through the outlet port 16 may be supplied directly to a silo or other vessel (or region) to be fumigated. If the phosphine concentration in this gas mixture is too high for its required use, additional air may be added to it. Alternatively, the water content of the gas entering the chamber 13 through the gas inlet port 14 may be reduced, to cause a decrease in the rate of water permeation through the membrane 12 and hence a decrease in the production rate of phosphine.

Two optional (but preferred) control features are included in the apparatus illustrated in FIG. 1. The first control feature is a blanking plate 17, which can be moved into the chamber 13, close to the membrane 12, to cover part of the membrane 12 and hence reduce the surface area of the membrane 12 which is exposed to the water in the gas which flows through the chamber 13. Reduction of the surface area of the membrane 12 in this way also reduces the rate of entry of water into the housing 10 and hence reduces the production rate of phosphine.

The complete covering of the membrane 12 with the blanking plate 17 will effectively stop the production of phosphine. When this occurs, or when the water content of the gas flowing through the chamber 13 is reduced to zero to cause the production of phosphine to cease, the preferred technique is to utilise the second safety feature, namely a member 18 (for example, a rod or bar) which contains (in any suitable manner) a compound, such as copper chloride, which absorbs phosphine. The member 18 is mounted outside the housing 10 in a manner which permits its insertion into the housing 10, to soak up any residual phosphine present within the housing or any phosphine that may be generated by water remaining in the housing 10.

Figure 2:
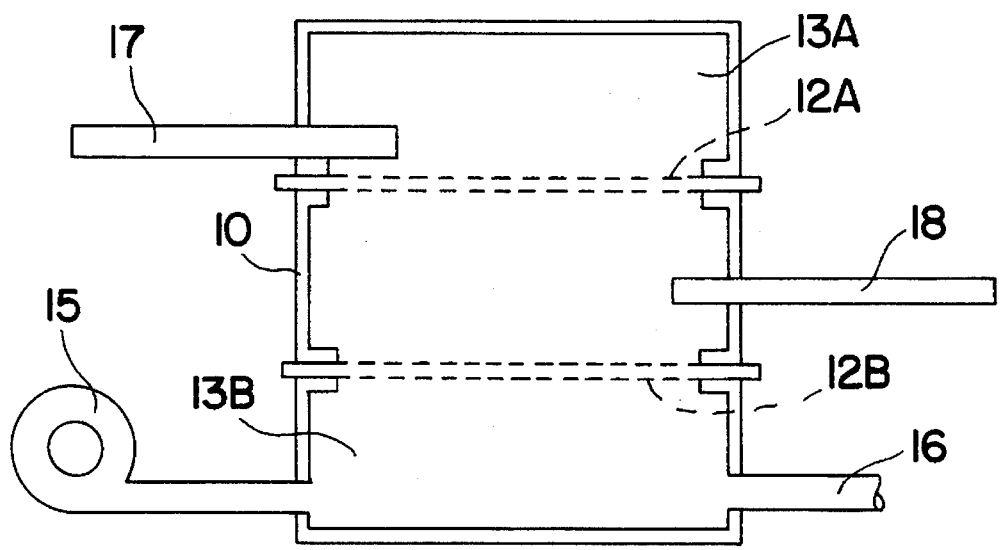
FIG. 2 is a partly schematic sectional view of an alternative form of the phosphine generating apparatus shown in FIG. 1.

FIG. 2 shows, in the same manner as FIG. 1, an alternative construction of the phosphine generating apparatus of FIG. 1. In FIG. 2, features and components which have a direct counterpart in FIG. 1 have been given the same reference number.

The main difference between the apparatus shown in FIG. 2 and the apparatus illustrated in FIG. 1 is that the housing 10 of the FIG. 2 embodiment has two open faces, which are closed by closure members comprising membranes 12A and 12B, respectively. The membrane 12A is permeable to water. The membrane 12B is permeable to phosphine. In practice, the membranes 12A and 12B may each be permeable to both water and phosphine.

A first chamber 13A, which contains moist air and may contain some liquid water, is mounted on top of the closure member which includes or consists of the membrane 12A. Note that a blanking plate 17 is included as a feature of the first chamber 13A.

A second chamber 13B, into which air is blown by a fan 15 through an inlet port 14, is mounted below the housing 10, with the membrane 12B forming at least part of a common wall between the housing 10 and the second chamber 13B. Phosphine, produced by the reaction of water which has permeated through the membrane 12A and has contacted the phosphide formulation in the housing 10, permeates through the membrane 12B, to become part of the gas flow out of the outlet port 16.

A phosphine absorber 18 is shown mounted for insertion into the housing 11. Alternatively, the absorber 18 may be mounted for insertion into the second chamber 13B, where it will absorb phosphine which enters the chamber 13B after permeating through the membrane 12B. If required, two phosphine absorbent members may be included in this apparatus, one mounted for insertion into the housing 10, the other mounted for insertion into the chamber 13B.

The apparatus illustrated in FIGS. 1 and 2 has an orientation such that the membrane 12 (or the membranes 12A and 12B) are horizontal. This is the normal way of constructing such apparatus. However, it is not essential that such apparatus should have this orientation. For example, the membrane 12 (or each of the membranes 12A and 12B) may have its planar surface vertical.

Figure 3:
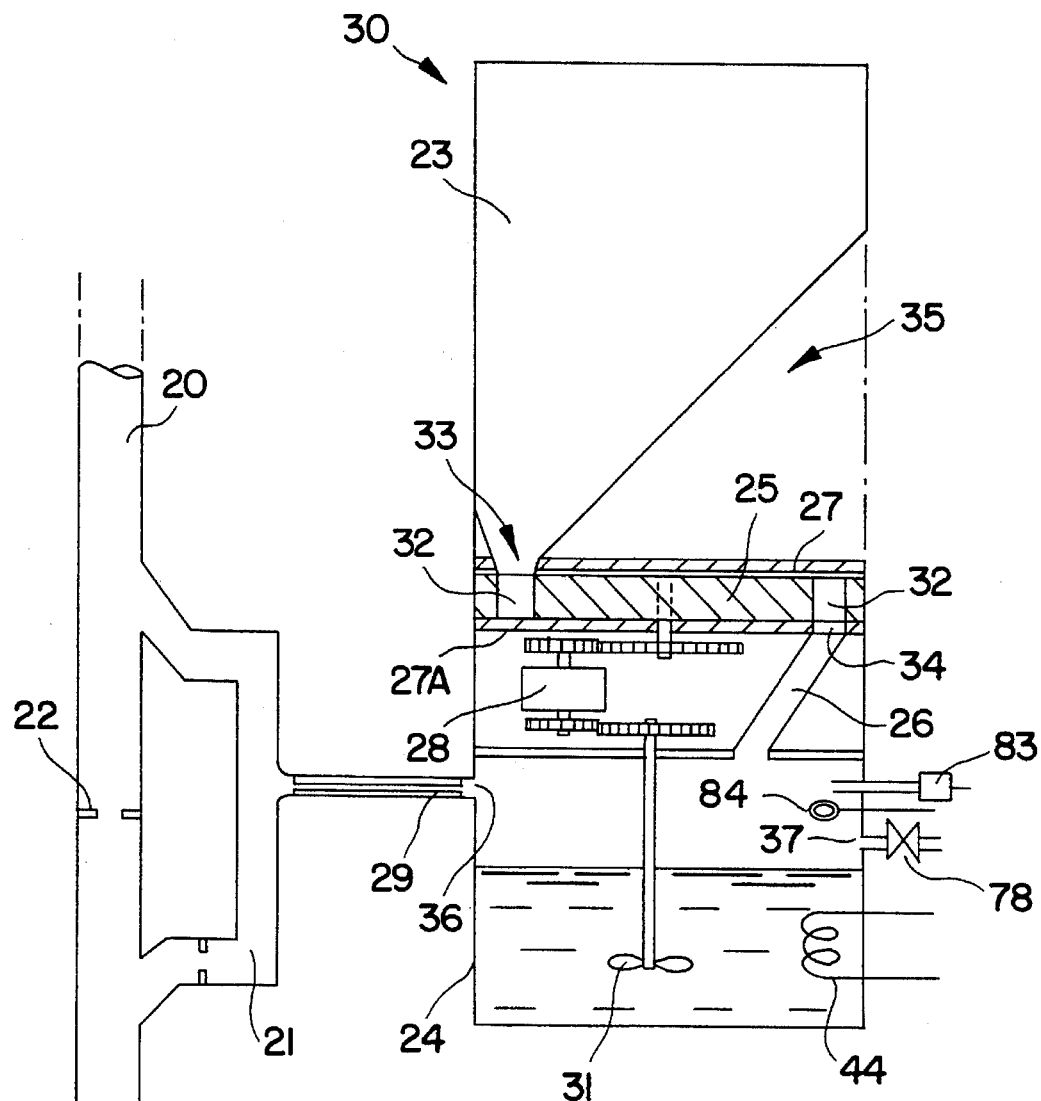
FIG. 3 is a partly schematic, partly sectional view of one form of apparatus for generating phosphine which utilises a transfer disc member to convey tablets or pellets of a phosphide formulation from a hopper to a water bath.
Figure 5:
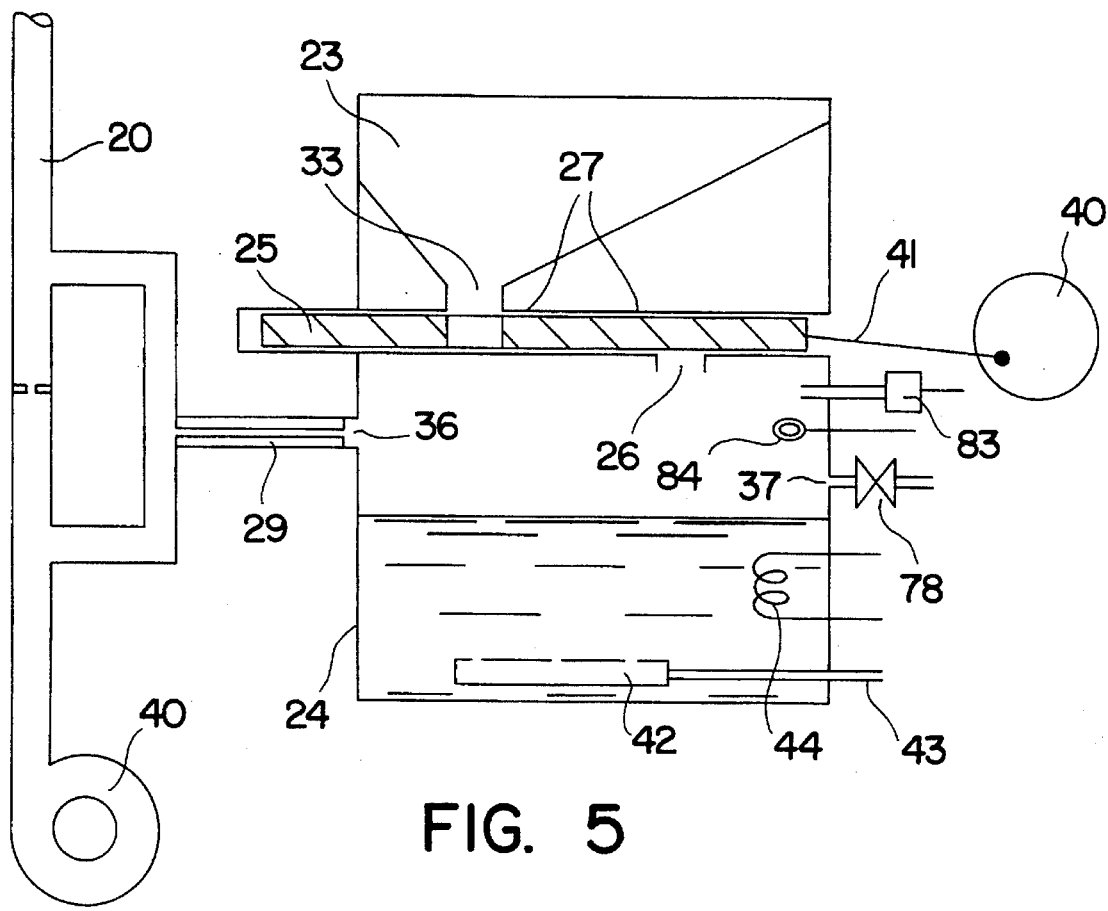
FIG. 5 is a drawing, similar to FIG. 3, illustrating an alternative form of the phosphine generating apparatus shown in FIG. 4.

FIGS. 3 and 5 depict preferred forms of apparatus for generating phosphine. The phosphine produced by these generators is included in a gas flow (usually an air flow) through a conduit 20. This gas flow will normally be fed into a grain storage facility or other region to be fumigated.

As shown in FIGS. 3 and 5, the gas (air) flow through the conduit 20 is established by a fan 40. The phosphine is supplied from a generator 30 which has a gas outlet port 36. This gas outlet port is connected to an arm 21 of the conduit 20 by a capillary 29. The capillary size is chosen so that the back pressure (that is, the over-pressure in the generator, which stops back-diffusion of the phosphine) is of the order of 5 kPa. The gas which flows through the arm 21 (by virtue of the inclusion of a baffle 22 in the conduit 20) establishes a slight low pressure region in the arm 21 to assist the extraction of phosphine through the capillary 29. However, if the fan 40 has a variable speed, so that the air flow through the conduit 20 can be varied though changes in the fan speed, the arm 21 can be omitted from this arrangement, and the capillary 29 will then feed directly into the conduit 20. If the air flow in the conduit is laminar at the point of connection of the capillary to the conduit 20, a turbulent mixer (which may comprise a baffle or ridges in the conduit) will be included downstream of this feed point.

The phosphine generator 30 comprises a hopper 23 mounted above, but separated from, a water chamber 24. The space between the hopper 23 and the water chamber 24 contains (in each illustrated embodiment) a disc member 25 which has at least one aperture 32 in it. The disc member 25 is moveable so that, for the (or each) aperture 32, there is a first location of the disc member 25 in which the aperture is directly below a discharge point 33 of the hopper 23, and a second location of the disc member 25 in which the aperture is positioned directly above an inlet port 26 of the water chamber 24. The way in which the disc member 25 is moved so that its aperture (or each aperture) is repeatedly positioned at its first and second locations will depend upon the nature of the disc member 25.

Figure 4:
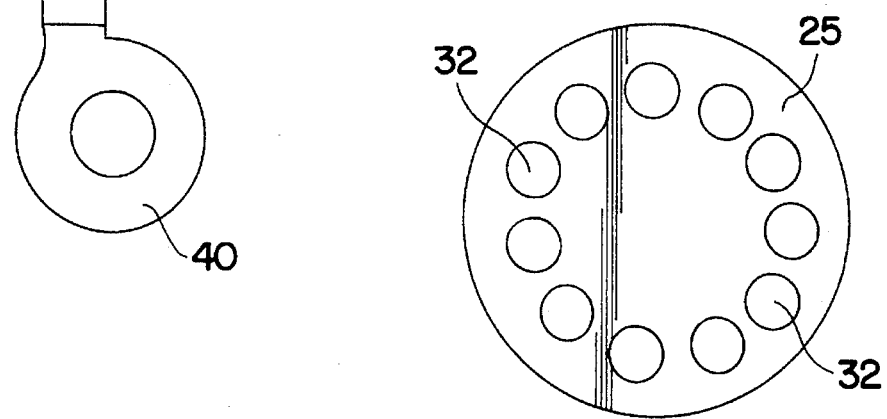
FIG. 4 is a plan view of a transfer disc member that may be used in the apparatus illustrated in FIG. 3.

In the embodiment illustrated in FIG. 3, the disc member 25 is a circular disc, mounted with its axis substantially vertically. An example of this type of disc member is shown in FIG. 4. Those familiar with fumigation equipment will recognise that the disc member 25 of FIGS. 3 and 4 is similar to the disc members that have been used for many years in the phosphine pellet dispenser that has been manufactured by the German company Deutsche Gesellschaft fur Sch ädlingsbekämpfung m.b.H. (generally known as "Degesch") for periodically depositing a pellet or tablet of the PHOS-TOXIN (trade mark) phosphide formulation, which is also a product of Degesch, into a moving stream of grain. A description of that pellet dispenser is provided in pages 23 to 26 of the booklet entitled "PHOSTOXIN for Fumigation of Grain and other Stored Products" (Edition XII, 1970), which was published by Degesch.

The circular disc member illustrated in FIG. 4 contains a plurality of apertures 32. The centres of the apertures 32 are equispaced from each other and lie on a circle having its centre of curvature at the centre of the axis of rotation of the disc 25. In fact (and this is also the case with the circular disc members of the Degesch pellet distributor), the disc 25 need not have more than one aperture 32. Any practical number of disc apertures 32 may be included in the disc 25.

The circular disc member 25 in the FIG. 3 embodiment is mounted between a pair of seals 27 and 27A, which have apertures in them adjacent to the hopper discharge point 33 and the water chamber inlet port 26. The disc member 25 is provided with a spindle which is connected, via a simple gear train, to the drive shaft of an electric motor 28. A similar simple gear train connects the drive shaft of the electric motor 28 to the spindle of a stirrer 31, which stirs the water in the water bath. In this way the electric motor 28 is used to rotate the disc member 25 and also to drive the stirrer 31.

Figure 6:
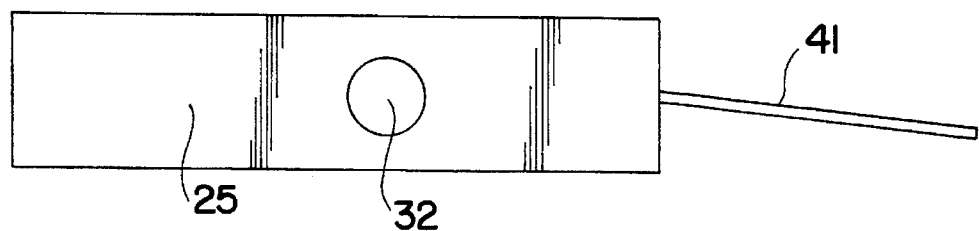
FIG. 6 is a plan view of the transfer disc member used in the apparatus depicted in FIG. 5.

In the embodiment illustrated in FIG. 5, the disc member 25 is a rectangular disc or shuttle, having the construction illustrated in FIG. 6 (with an aperture 32 in the disc, dimensioned to receive a tablet or pellet of a phosphide formulation). The shuttle or disc member 25 is mounted for linear reciprocal movement within a guide, so that its single aperture 32 is positioned, alternately, below the discharge point 33 of the hopper 23 (this is the first location of the disc member 25) and above the inlet port 26 of the water chamber 24 (the second location of the disc member 25). Seals 27 and 27A ensure that there is a gas-tight seal between the hopper outlet and the water chamber inlet port.

The reciprocal movement of the shuttle 25 is effected, in the embodiment illustrated in FIG. 5, by rotation of a disc 40. One end of a rod 41 is connected to an off-centre point of the disc 40. The other end of the rod 41 is connected to the end of the shuttle or disc member 25. In fact, this mechanism for effecting reciprocal movement of the disc member 25 has been successfully used by the present inventors in a prototype of the phosphine generator, constructed as shown in FIG. 5. However, it will be appreciated that a solenoid and spring arrangement could be used, instead of the rotating disc 40, to cause reciprocal movement of the disc member 25.

In the embodiment of FIG. 5, a bubbler 42 at the bottom of the water chamber 24 is connected to a gas line 43. When gas (preferably nitrogen) is passed through the gas line 43, the bubbles produced in the water in the chamber 24 effectively stir the water. However, a separate stirrer, powered by an associated electric motor, could be included in the chamber 24 in place of, or in addition to, the bubbler 42.

In both the embodiment of FIG. 3 and the embodiment of FIG. 5, a heater 44 is provided, which is used in a conventional manner with a thermostat to maintain the water in the chamber 24 at a constant temperature. In the prototype equipment which has been constructed to test this aspect of the present invention, the water in the water bath was maintained at a temperature of about 30° C. Variation of the temperature of the water bath may be used to control the rate of production of phosphine by the generators illustrated in FIGS. 3 and 5.

When the generators shown in FIGS. 3 and 5 are used to generate phosphine, pellets or tablets of a phosphide formulation (usually a formulation based on aluminium phosphide or magnesium phosphide) are placed in the hopper 33. In principle, a powdered phosphide formulation could be used in the hopper 33, but the present inventors have found that when powder formulations are used, it is not possible to provide a constant supply of the phosphide formulation to the water chamber 24 over a period of seven to twenty-eight days. Thus the use of powdered phosphide formulations in the hopper 23 is not preferred. In contrast to this experience, the present inventors have successfully used the prototype generator with up to 80 pellets of PHOSTOXIN (trade mark) formulation in the hopper 23. Each pellet has a mass of 0.6 g and yields, when reacted with water, 0.2 g of phosphine. In each experiment with the prototype equipment, a pellet has been deposited into the aperture 32 in the disc member 25 of the prototype equipment whenever the aperture has been positioned below the hopper outlet, thus ensuring a constant supply of phosphide formulation to the water chamber, and hence a constant generation rate of phosphine. Tablets of PHOSTOXIN phosphide formulation have also been successfully delivered from the hopper to the water chamber of the present invention.

To transfer a pellet of a phosphide formulation from the hopper to the water in the chamber 24, the disc member 25 is positioned in its "first location", with the (or a selected) aperture 32 beneath the hopper outlet 33. A pellet then falls into the aperture 32. The disc member 25 is then rotated (in the case of the FIG. 3 embodiment) or moved linearly (in the case of the FIG. 5 embodiment) until the disc member is in its "second location", with the aperture above the inlet port 26 of the chamber 24. At this location, the pellet falls from the aperture and into the water in the chamber 24.

The water in the chamber 24 is preferably water which has been acidified with sulphuric acid to be a 5 per cent solution of sulphuric acid. Preferably the acidified water also contains a wetting agent to prevent frothing of the water when the phosphide material reacts with the water and phosphine is generated.

The phosphine produced in the chamber 24 by the reaction of the water with the phosphide formulation leaves the chamber 24 through the gas outlet port 36 and the capillary 29, to enter the gas flow through the conduit 20, as described above. It will be appreciated that the gas outlet port 29 must be located above the normal water level in the chamber 24. However, the gas outlet port need not be in the (or a) side wall of the chamber 24.

In the embodiment shown in FIG. 3, a preferred feature is the inclusion of copper chloride and a desiccant material in the space 35 between the hopper 23 and the upper seal 27. It should be noted that the seals 27 and 27A need not cover (as shown in FIG. 3) the entire region above and below the disc member 25, but may extend only around the region of the hopper outlet 33 and the upper entrance of the inlet port 26 of the chamber 24. It should also be noted that the drive mechanism for the disc 25 and the optional stirrer 31 may be any suitable drive arrangement, and need not be of the form (or in the location) shown in FIG. 3.

Control of the rate of production of phosphine using the apparatus shown in FIGS. 3 and 5 may be achieved by varying the movement rate of the disc member 25, by controlling the size and number of the apertures 32 in the disc member 25 in the FIG. 3 embodiment, and by controlling the temperature of the water in the chamber 25.

For long term operation of the apparatus shown in FIGS. 3 and 5, there must be a stoichiometric excess of water relative to the charge of pellets or tablets in the hopper 23, since some water is carried over with the phosphine into the conduit 20.

The prototype equipment constructed as shown in FIG. 5, operating so that 7 pellets of aluminium phosphide are dropped per hour into the water chamber 24, produces phosphine in sufficient quantity to enable a silo of grain, containing 2,000 tonnes of grain, to be fumigated using the constant linear velocity phosphine fumigation method described in the specification of International patent application No. PCT/AU90/00268. In general, the required phosphine concentration in the gas (air) in the conduit 20 for most fumigation purposes will be in the range of from 0.005 g phosphine per cubic metre to 5.0 g phosphine per cubic metre.

In tests using the prototype equipment constructed in accordance with FIG. 5, up to 80 pellets of PHOSTOXIN (trade mark) formulation have been delivered successfully to the water chamber, at rates of 8 pellets per hour and 16 pellets per hour, to produce phosphine at the expected constant rate. At the end of each test, no unreacted phosphide material remained in the water in the water chamber.

Although the control features of each form of the present invention described above should enable any skilled user to generate the correct concentration of phosphine for the fumigation task without the risk of an explosion, nevertheless the reaction vessel (or at least the part of the generator containing the phosphide formulation) should be constructed to remain intact in the event that an explosive concentration of phosphine is produced and an explosion occurs.

Figure 7:
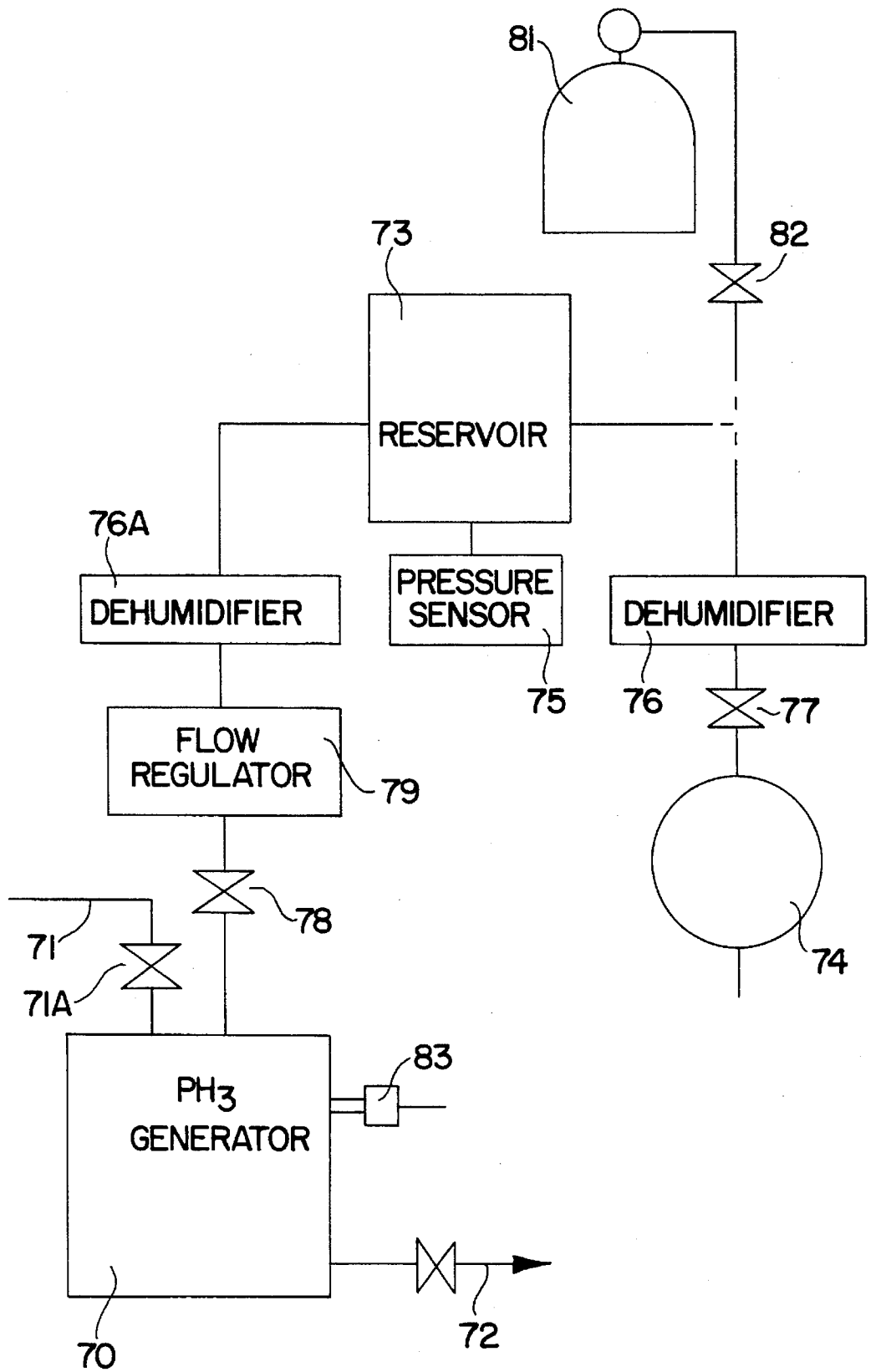
FIG. 7 is a block diagram which illustrates alternative embodiments of the safety system which is preferably included with phosphine generating apparatus of the type illustrated in FIGS. 3 and 5.

As a further safety measure, the safety system illustrated in FIG. 7 may be used with phosphine generators of the present invention.

In FIG. 7, a phosphine generator 70 is shown with an air input line 71. The air input line corresponds to the air input provided by the fan 15 of the phosphine generators featured in FIGS. 1 and 2 and to the moist air input of the phosphine generator featured in European Publication No A-0318040. There is no direct equivalent to the air input line 71 in the phosphine generators illustrated in FIGS. 3 and 5. The phosphine generated by the generator 70 is output through a conduit 72 to a grain silo or other required destination for the phosphine.

The safety system for the generator 70 comprises a reservoir 73 which contains a purge gas. The purge gas will normally be air, compressed in the reservoir 73 by the action of a compressor 74, which operates when power is supplied to the phosphine generator system and which continues to operate until a pressure sensor 75, connected to the reservoir 73, provides a signal indicating that the pressure of air in the reservoir 73 has reached a predetermined value. Normally, the air in the reservoir will be dehumidified, preferably by the dehumidifier 76 before it enters the reservoir 73, but optionally on leaving the reservoir 73, by the action of a dehumidifier 76A. The dehumidifier 76 (or 76A) may be a desiccator bed or a condenser. A non-return valve 77 and a valve 78 in the outlet line from the reservoir 73 (the valve 78 is closed when the phosphine generator is functioning normally) ensure that the gas pressure in the reservoir 73 is maintained at its predetermined value when the phosphine generator is operating normally and the compressor 74 is not operating. Any leakage of purge gas from the reservoir will be detected as a reduction in gas pressure by the sensor 75, which will result in the compressor 74 being re-activated until the required purge gas pressure has been re-established.

The alternative purge gas supply arrangement shown in FIG. 7 comprises a cylinder of compressed nitrogen 81 (which may be replaced with a cylinder of another compressed inert gas, such as carbon dioxide) which is connected to the reservoir 73 through a valve 82. The valve 82 is opened only when power is supplied to the phosphine generator system and the pressure in the reservoir 73, sensed by the sensor 75, is below the predetermined value.

When the generator 70 is a generator which relies upon moist air in the line 71 to generate phosphine, the valve 78 and a valve 71A in the air supply line 71 are constructed as a single, solenoid operated, three way valve. When the solenoid of this three way valve is not activated, the valve 71A is closed and the valve 78 is open, allowing purge gas from the reservoir 73 to flow into the generator 70, through a flow regulator 79, until the gas pressure in the generator 70 is equal to the (reduced) gas pressure in the reservoir 73. When power is connected, or re-connected, to the phosphine generator system, the solenoid of the three way valve is activated to close the valve 78, but not to open the valve 71A. Only when the pressure in the reservoir 73 has reached its predetermined value, or a known percentage of that predetermined value, and a supply of purge gas is thus available for use, is the solenoid of the three way valve activated to open the valve 71A.

In other phosphine generation systems, the valve 78 is normally closed, but is opened whenever there is no power supply to the phosphine generator system. Thus, in the event of a sudden power failure during normal operation of the phosphine generator, or when the phosphine generator is switched off unintentionally or as a consequence of normal shut-down after a period of use, the valve 78 is opened and the purge gas from the reservoir 73 flows into the generator 70 via the flow regulator 79.

The operation of the valves 71A, 77, 78 and 81 in response to the presence or absence of an electrical power supply, or in response to a specified sensed pressures, is well known technology and thus need not be explained further in this specification.

Pressure relief valves, including a pressure relief valve 72A in the gas outlet line 72 from the generator 70, will usually be provided at different points in the safety system, in accordance with normal practice.

If the safety system shown in FIG. 7 is to be used with the phosphine generators illustrated in FIGS. 3 and 5, the purge gas supply will be connected to an inlet port 37 of the water chamber 24. In fact, the valve 78 of FIG. 7 is shown in FIGS. 3 and 5, connected to the inlet port 37.

When the safety system is used with a phosphine generator of the type shown in FIGS. 3 and 5, the valve 78 of the safety system is also adapted to be opened when the pressure in the generator 70, sensed by a pressure sensor 83, exceeds a predetermined value. Such an increase in pressure in the generator 70 will normally occur only if an excess of phosphine is produced. Similarly, the valve 78 of the safety system may be adapted to be opened when a phosphine concentration sensor 84 in the water chamber 24 of the generator of FIGS. 3 and 5 indicates that the phosphine concentration in the chamber has exceeded a predetermined value. Thus opening the valve 78 will ensure that the phosphine is diluted by purge gas and will not reach an explosive concentration.

Figure 8:
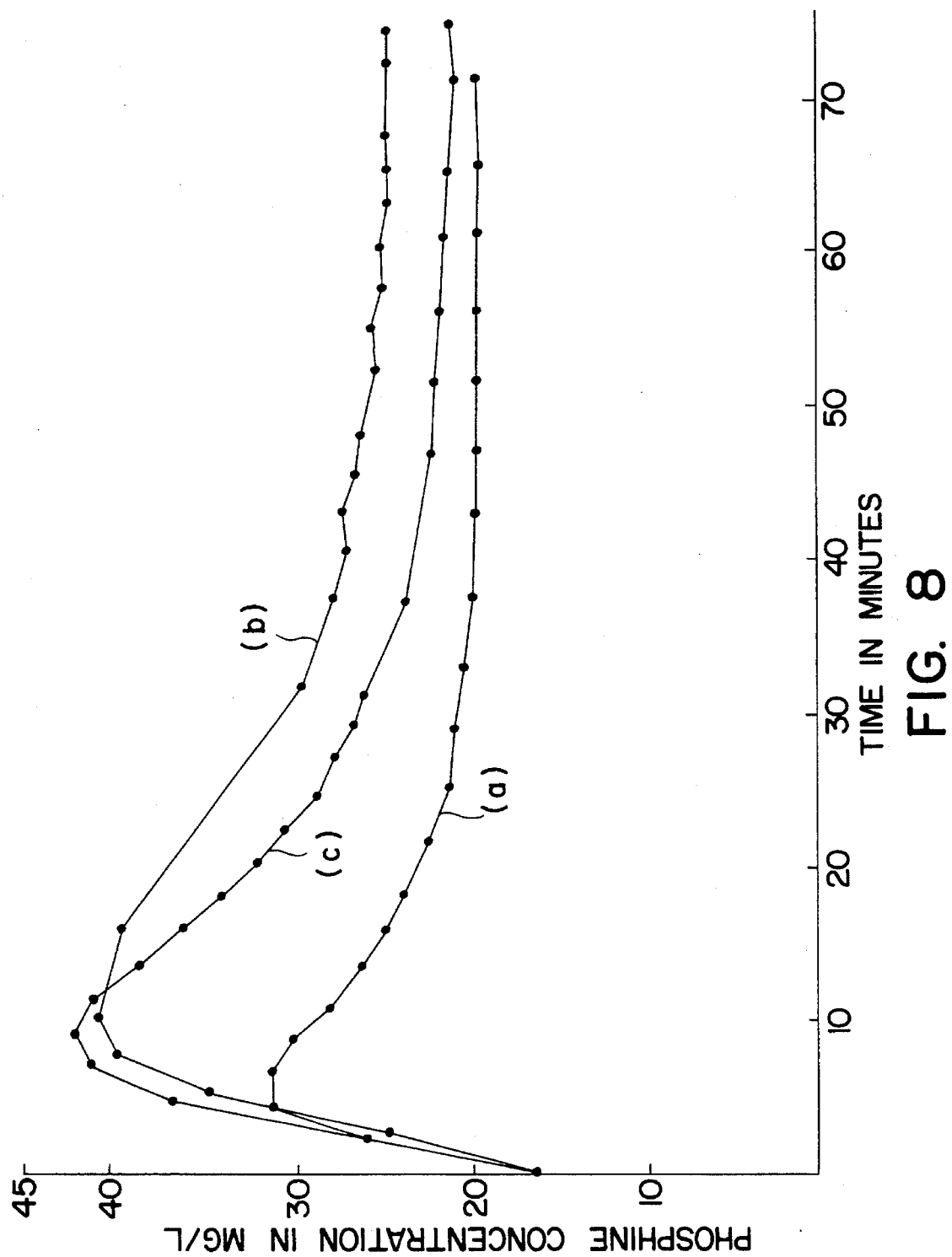
FIG. 8 shows how the phosphine concentration in the chamber of a phosphine generator varies following a simulated disconnection of electrical power to the generator and the activation of the safety system illustrated in FIG. 7.

FIG. 8 illustrates the effectiveness of the safety system of FIG. 7, using compressed air as the purge gas, with the reservoir 73 connected to the housing (containing a phosphide formulation) of a prototype phosphine generator constructed in accordance with the embodiment illustrated in FIG. 2. To test the safety system, the air flow created by the fan 15 was reduced from 80 ml per minute to (a) 40 ml per minute, (b) 20 ml per minute, and (c) 10 ml per minute. Simultaneously with the reduction of air flow, the electrical power to the safety system was removed, to simulate a power failure and cause the safety system to be actuated. Measurements of the phosphine concentration in the air flow leaving the generator were made for up to 75 minutes after this action was taken.

In the absence of the safety system, the phosphine concentration in the air flow through the outlet port 16 would rise to an unacceptably high value. As shown in FIG. 8, in each test there was an initial increase in phosphine concentration in the (reduced) air flow leaving the outlet port 16, but at no stage did the phosphine concentration reach a value approaching the explosion concentration, and within nine minutes the concentration of phosphine in the air flow had begun to fall.

It will be clear that the safety shown in FIG. 7 effectively prevents the establishment of a high concentration of phosphine in the event of a failure of the electrical power supplied to a phosphine generator, or during normal shut-down of the phosphine generator, or in the event of a failure of the normal operation of the generator. However, on restoration of power to the generator, or correction of the malfunction of the generator, the phosphine production can be resumed immediately. This is particularly beneficial when phosphine is being generated continuously, for fumigation purposes, in a remote region where constant supervision of the generator is not possible.

It should be appreciated that although specific examples of realisations of the present invention have been illustrated and described, variations to the examples may be made without departing from the present inventive concepts. For example, the disc member 25 of the embodiment of FIGS. 3 and 5 may be replaced with a simple conveyor system on which pellets of the phosphide formulation in the hopper 23 may be placed. In addition, the membrane(s) of the embodiments shown in FIGS. 1 and 2 may be replaced with any suitable alternative means (such as a sheet of a ceramic material) through which water and phosphine permeate.

We claim:

1. A method of generating phosphine, said method comprising the steps:

(a) providing a first container, containing water;

(b) mounting, on top of said first container and in spaced relationship thereto, a second container, the second container containing a plurality of tablets or pellets of a phosphide formulation;

(c) periodically removing one of the tablets or pellets of the phosphide formulation from the second container and depositing the removed tablet or pellet in said first container, whereby the tablet or pellet contacts and reacts with the water in the first container to form phosphine; and (d) removing the phosphine so produced from the first container.

2. A method as defined in claim 1, in which said second container is a hopper having a hopper outlet, and step (c) is effected by a disc member mounted between said first container and said second container; said disc member having at least one aperture therein; said disc member being moved so that said at least one aperture is positioned, alternately, (i) directly beneath said hopper outlet, so that a tablet or pellet is discharged from said hopper outlet and into said aperture, and (ii) directly above an inlet port of said first chamber, so that a tablet or pellet within said aperture falls into said inlet port and hence into water in said first container.

3. A method as defined in claim 1, including the step of maintaining the water in said first chamber at a predetermined temperature, thereby controlling the rate of production of phosphine.

4. A method as defined claim 1, in which said water contains sulphuric acid.

5. A method as defined in claim 1, including the step of stirring or agitating said water during the production of phosphine.

6. Apparatus for generating phosphine, said apparatus comprising
 (a) a chamber adapted to contain water, said chamber having a gas outlet port above the level of water normally within the chamber, said chamber being closed by a top wall having an inlet port therein;
 (b) a hopper adapted to contain a plurality of tablets or pellets of a phosphide formulation, said hopper being mounted above said chamber, said hopper having a tablet or pellet outlet;
 (c) tablet or pellet transfer means mounted between said hopper and said chamber, said transfer means comprising a disc member having at least one aperture therein, said or each aperture being dimensioned to receive one of said tablets or pellets, said disc member being moveable so that said or each aperture may be periodically positioned at a first location in which the or each aperture is directly below the tablet or pellet outlet of the hopper, and at a second location in which said or each aperture is directly above the inlet port of said chamber, whereby a pellet or tablet deposited in the aperture at the first location is discharged from the aperture and into said chamber when the aperture is at said second location; and
 (d) means to cause the movement of said disc member;
whereby, when the apparatus is in use, each tablet or pellet of phosphide formulation which falls from (the or an) aperture in the disc member into said chamber reacts with water in the chamber to produce phosphine, said phosphine being removed from the chamber through the gas outlet port.

7. Apparatus as defined in claim 6, including a stirrer adapted to stir water in said chamber.

8. Apparatus as defined in claim 6, including a gas bubbler in said chamber, adapted to bubble gas through water in said chamber, to thereby stir said water.

9. Apparatus as defined in claim 6, in which said disc member is a circular disc member which is rotatable about a substantially vertical axis, and said means to cause movement of the disc member is an electric motor having a drive shaft which is connected by a gear train to a spindle at the axis of said disc member.

10. Apparatus as defined in claim 6, in which said disc member is an elongate disc member having a single aperture therein, said disc member being mounted for reciprocal linear movement within a guide.

11. Apparatus as defined in claim 10, in which said means to cause movement of the disc member comprises a rotatable disc mounted adjacent to said disc member with its axis of rotation substantially in line with the elongate direction of the disc member, and a connecting rod extending from (a) the end of the disc member closest to said rotatable disc, to (b) a mounting point on said rotatable disc, said mounting point being off-centre of said rotatable disc.

12. Apparatus as defined in claim 10, in which said means to cause movement of the disc member comprises a solenoid connected to one end of said disc member.

13. Apparatus as defined in claim 6, including seals (a) between the periphery of the pellet outlet of said hopper and said disc member, and (b) between the periphery of the inlet port of said chamber and said disc member.

14. Apparatus as defined in claim 6, including a gas outlet port in said chamber, through which phosphine produced in the chamber is removed.

15. Apparatus as defined in claim 6, including a gas pressure sensor operatively connected to said chamber to monitor the gas pressure therein.

16. Apparatus as defined in claim 6, including a phosphine concentration sensor operatively connected to said chamber to monitor the phosphine concentration therein.

17. Apparatus for generating phosphine as defined in claim 6, including a safety system, said safety system comprising:
 (a) a reservoir containing a purge gas at a relatively high pressure;
 (b) a purge gas supply conduit connecting said reservoir to said chamber;
 (c) a flow regulator and a closed valve in said purge gas supply conduit; and
 (d) valve activation means, responsive to at least one sensor adapted to monitor a respective operating condition of said generator, for opening said valve when said sensor or at least one of said sensors indicates a predetermined operating condition within said chamber.

18. Apparatus as defined in claim 17, including purge gas supply means connected to said reservoir.

19. Apparatus as defined in claim 18, in which said purge gas is air and said purge gas supply means comprises an air compressor.

20. Apparatus as defined in claim 19, including dehumidifying means connected between said air compressor and said flow regulator.

21. Apparatus as defined in claim 19, including dehumidifying means connected between said reservoir and said flow regulator.

22. Apparatus as defined in claim 18, in which said purge gas is an inert gas and said purge gas supply means comprises a cylinder of said inert gas at a relatively high pressure.

23. Apparatus as defined in claim 22, in which said inert gas is nitrogen.

24. Apparatus as defined in claim 22, in which said inert gas is carbon dioxide.

25. Apparatus as defined in claim 17, in which said sensor or one of said sensors is a gas pressure sensor operatively connected to said generator to monitor the gas pressure within said chamber, and said predetermined operating condition comprises a pressure of the gas within said chamber in excess of a predetermined gas pressure value.

26. Apparatus as defined in claim 17, in which said sensor or one of said sensors is a phosphine concentration sensor adapted to sense the concentration of phosphine in said chamber, and said predetermined operating condition is a concentration of phosphine in said chamber in excess of a predetermined phosphine concentration value.

27. Apparatus as defined in claim 17, in which said sensor or one of said sensors is a power supply sensor adapted to sense whether power is supplied to the phosphine generator, and said predetermined operating condition is a cessation of the supply of power to the generator after a period of use of the generator.

28. A method of generating phosphine comprising the steps of
   (a) providing a housing in which is located a quantity of a metal phosphide formulation, the housing being closed by a membrane that is permeable to water and phosphine; and
   (b) establishing, outside the housing but adjacent to the membrane, a flow of gas which contains water vapour or liquid water;
whereby water from said gas flow permeates through the membrane and reacts with the phosphide formulation to form phosphine, the phosphine then permeating through the membrane and entering said gas flow.

29. A method of generating phosphine comprising the steps of
   (a) providing a housing in which is located a quantity of a metal phosphide formulation, the housing being closed by first and second closure members, said closure members being separate from each other, said first closure member comprising a first membrane that is permeable to water, said second closure member comprising a second membrane that is permeable to phosphine;
   (b) establishing a gas flow outside the housing across the second membrane; and
   (c) establishing an atmosphere containing water vapour or water, or providing a layer of water, outside said housing but adjacent to said first membrane;
whereby water permeates through the first membrane and reacts with the phosphide formulation to form phosphine, the phosphine thus produced then permeating through the second membrane to enter said gas flow.

30. Apparatus for the generation of phosphine comprising:
   (a) a housing constructed of a water-impermeable material, said housing being adapted to contain a quantity of a metal phosphide formulation;
   (b) a closure member for said housing, said closure member comprising a membrane that is permeable to water or water vapor and is also permeable to phosphine;
   (c) a chamber located adjacent to said housing, said membrane comprising at least part of a common wall of said chamber and said housing;
   (d) means to establish a flow of gas containing water vapor or liquid water through said chamber; and
   (e) a blanking plate operatively connected to said chamber, said blanking plate being movable adjacent to said membrane, to cover a portion of said membrane.

31. Apparatus as defined in claim 30, including a phosphine absorbent member operatively connected to said housing, said phosphine absorbent member being moveable into said housing to absorb phosphine present therein.

32. Apparatus for the generation of phosphine as defined in claim 19, including a safety system, said safety system comprising:
   (a) a reservoir containing a purge gas at a relatively high pressure;
   (b) a purge gas supply conduit connecting said reservoir to said housing;
   (c) a flow regulator and a closed valve in said purge gas supply conduit; and
   (d) valve activation means, responsive to at least one sensor adapted to monitor a respective operating condition of said generator, for opening said valve when said sensor or at least one of said sensors indicates a predetermined operating condition within said housing.

33. Apparatus as defined in claim 32, including purge gas supply means connected to said reservoir.

34. Apparatus as defined in claim 23 in which said purge gas is air and said purge gas supply means comprises an air compressor.

35. Apparatus as defined in claim 34 including dehumidifying means connected between said air compressor and said reservoir.

36. Apparatus as defined in claim 34 including dehumidifying means connected between said reservoir and said flow regulator.

37. Apparatus as defined in claim 33 in which said purge gas is an inert gas and said purge gas supply means comprises a cylinder of said inert gas at a relatively high pressure.

38. Apparatus as defined in claim 37, in which said inert gas is nitrogen.

39. Apparatus as defined in claim 37, in which said inert gas is carbon dioxide.

40. Apparatus as defined in claim 32, in which said sensor or one of said sensors is a gas pressure sensor operatively connected to said generator to monitor the gas pressure within said housing, and said predetermined operating condition comprises a pressure of the gas within said housing in excess of a predetermined gas pressure value.

41. Apparatus as defined in claim 32, in which said sensor or one of said sensors is a phosphine concentration sensor adapted to sense the concentration of phosphine in said housing, and said predetermined operating condition is a concentration of phosphine in said housing in excess of a predetermined phosphine concentration value.

42. Apparatus as defined in claim 32, in which said sensor or one of said sensors is a power supply sensor adapted to sense whether power is supplied to the phosphine generator, and said predetermined operating condition is a cessation of the supply of power to the generator after a period of use of the generator.

43. Apparatus for the generation of phosphine comprising:
   (a) a housing constructed of a water impermeable material and adapted to contain a quantity of a metal phosphide formulation;
   (b) a first closure member for said housing, said first closure member comprising a first membrane that is permeable to water;
   (c) a second closure member for said housing, said second closure member being separate from said first closure member, said second closure member comprising a second membrane, said second membrane being permeable to phosphine;
   (d) a first chamber located adjacent to said housing, first membrane comprising at least part of a common wall of said first chamber and said housing;
   (e) a second chamber located adjacent to said housing, said second membrane comprising at least part of a common wall of said second chamber and said housing; and
   (f) means to establish a flow of gas through said second chamber.

44. Apparatus as defined in claim 43, including a blanking plate operatively connected to said first chamber, said blanking plate being moveable adjacent to said first membrane, to cover a portion of said first membrane.

45. Apparatus as defined in claim 44, including a phosphine absorbent member operatively connected to said second chamber, said phosphine absorbent member being moveable into said second chamber to absorb phosphine present therein.

* * * * *